United States Patent
Graham et al.

(10) Patent No.: US 10,928,196 B2
(45) Date of Patent: Feb. 23, 2021

(54) VISION LASER RECEIVER

(71) Applicant: Topcon Positioning Systems, Inc., Livermore, CA (US)

(72) Inventors: Renard Tomas Graham, Antioch, CA (US); Donna Kelley, Louisville, CO (US)

(73) Assignee: Topcon Positioning Systems, Inc., Livermore, CA (US)

( * ) Notice: Subject to any disclaimer, the term of this patent is extended or adjusted under 35 U.S.C. 154(b) by 512 days.

(21) Appl. No.: 15/856,318

(22) Filed: Dec. 28, 2017

(65) Prior Publication Data
US 2019/0204078 A1  Jul. 4, 2019

(51) Int. Cl.
*G01C 9/06* (2006.01)
*G01C 15/00* (2006.01)
*G01S 17/875* (2020.01)

(52) U.S. Cl.
CPC ............ *G01C 9/06* (2013.01); *G01C 15/006* (2013.01); *G01S 17/875* (2013.01); *G01C 2009/066* (2013.01)

(58) Field of Classification Search
CPC .. G01C 9/06; G01C 15/006; G01C 2009/066; G01S 17/875
USPC ....................................................... 356/4.01
See application file for complete search history.

(56) References Cited

U.S. PATENT DOCUMENTS

| | | | |
|---|---|---|---|
| 4,231,700 A | 11/1980 | Studebaker | |
| 4,830,489 A | 5/1989 | Cain et al. | |
| 5,742,069 A | 4/1998 | Steenwyk et al. | |
| 5,935,183 A | 8/1999 | Sahm et al. | |
| 6,573,981 B2 | 6/2003 | Kumagai et al. | |
| 7,277,053 B2 | 10/2007 | Riel et al. | |
| 7,293,376 B2 | 11/2007 | Glover | |
| 7,394,527 B2 | 7/2008 | Essling et al. | |
| 7,409,312 B2 | 8/2008 | Conner et al. | |
| 7,486,403 B2 | 2/2009 | Osaka et al. | |
| 7,689,032 B2 | 3/2010 | Strassenburg-Kleciak | |
| 8,304,733 B2 * | 11/2012 | Alameh | G06F 3/0308 |
| | | | 250/349 |
| 8,537,216 B2 | 9/2013 | Guertler | |
| 8,550,444 B2 | 10/2013 | Nygaard et al. | |
| 8,723,068 B2 | 5/2014 | Nygaard | |

(Continued)

FOREIGN PATENT DOCUMENTS

EP  2559967 A1  2/2013
WO  2010054519 A1  5/2010

(Continued)

OTHER PUBLICATIONS

WO2010054519, machine translation into English, created May 14, 2020, 7. pp. (Year: 2020).*

(Continued)

*Primary Examiner* — Daniel L Murphy
(74) *Attorney, Agent, or Firm* — Chiesa Shahinian & Giantomasi PC

(57) ABSTRACT

A vision laser receiver having a sensing surface with a fixed geometry such that laser light received by the sensing surface will illuminate a particular section of the sensing surface and the precise elevation and/or tilt of the laser receiver will be determined from the illumination of the sensing surface.

26 Claims, 13 Drawing Sheets

(56) References Cited

U.S. PATENT DOCUMENTS

| | | | |
|---|---|---|---|
| 2007/0199996 A1* | 8/2007 | He | G06K 7/12 235/462.43 |
| 2010/0053595 A1 | 3/2010 | Lee | |
| 2011/0102763 A1 | 5/2011 | Brown et al. | |

FOREIGN PATENT DOCUMENTS

| | | |
|---|---|---|
| WO | 2014095784 A1 | 6/2014 |
| WO | 2014133646 A2 | 9/2014 |

OTHER PUBLICATIONS

Invitation to Pay Additional Fees mailed Apr. 12, 2019, in connection with International Patent Application No. PCT/US2018/067493, 15 pages.

International Search Report and Written Opinion dated Jun. 4, 2019, in connection with International Patent Application No. PCT/US2018/067493, 19 pages.

Steinvall, "Effects of Target Shape and Reflection on Laser Radar Cross Sections," Aug. 20, 2000, Applied Optics, Optical Society of America, vol. 39, No. 24, pp. 4381-4391.

Topcon Corporation, "Laser Indicate Receivers and Remote Displays," LS-B Series, Jan. 2014, 4 pgs.

Topcon Corporation, "LS Series: Machine Mounted Laser Receivers," Equipment Automation Product, Creation Magazine, 2001, 3 pgs.

Topcon Corporation, "Next Generation Self-Leveling Construction Laser," RL-H4C, 2012 and 2017, 4 pgs.

Dipert et al., "Eye, Robot: the Next Big Thing in Digital Signal Processing," Jun. 13, 2012, IEEE Solid-State Circuit Magazine, pp. 26-29.

International Preliminary Report on Patentability dated Jul. 9, 2020, in connection with International Patent Application No. PCT/US2018/067493, filed Dec. 26, 2018, 13 pgs.

* cited by examiner

300

340

VIEW B

400

440

500

540

VIEW B

900

920 — 910

VISION LASER RECEIVER

TECHNICAL FIELD

The present invention relates generally to laser receivers, and more particularly, to laser receivers of the type utilized in a variety of worksite applications such as construction and/or agricultural applications.

BACKGROUND

Worksite preparation typically includes grading and excavating portions of the worksite to form desired slopes or footprints. Relative elevation measurement is a critical element in most construction and agricultural worksite applications and the use of laser receivers to facilitate elevation measurement in such applications is widespread. For example, laser receivers are commonly attached to construction equipment (e.g., dozers, scrapers, excavators, and the like) to improve grading and excavating accuracy.

With respect to laser detection, these laser receivers typically include multiple radiation or sensing arrays, which are spatially arranged in a vertical pattern and which respond to impingement by a radiation source such as a laser beam. To achieve high precision and 360 degree detection such lasers typically utilize three (3) or four (4) sensing arrays spaced at 120 degree or 90 degree intervals, as the case may be. Each array of the laser receiver requires multiple individual photo detectors and associated monitoring circuitry. These laser receivers achieve high accuracy levels but design requirements do increase the overall part count, mechanical and electrical complexity, and cost of such laser receivers, as well as, increasing the potential for decreased reliability given the increased part count and overall complexity.

Therefore, a need exists for a laser receiver configuration that has a streamlined mechanical and electrical design, reduced cost, and increased reliability without sacrificing any precision or accuracy.

BRIEF SUMMARY OF THE EMBODIMENTS

In accordance with various embodiments, a vision laser receiver is disclosed having a light receptive surface with a fixed geometry such that laser light striking the sensing surface will illuminate a particular section of the sensing surface and be visible, observable and/or detectable. An image sensor will observe and detect the illumination of the light receptive surface and the precise elevation and/or tilt of the laser receiver will be determined from the illumination of the light receptive surface.

In accordance with an embodiment, a laser receiver is provided which comprises a housing and a light receptive surface configured therein having a fixed geometry and which is light receptive. As used herein with respect to the light receptive surface, the term "light receptive" will be understood to mean a surface that is receptive to an incoming light beam such that the light beam is visible, observable and/or detectable at or on the surface. For example, the light receptive surface can be in the shape of a cone, column, cylinder or other similar fixed, geometric shape. The geometry of the light receptive surface, together with the light receptivity of the surface, will facilitate the elevation determination in accordance with various embodiments as detailed further herein below. The laser receiver also has an image sensor, illustratively, a camera, charge-coupled device (CCD) or CMOS image sensor for observing and detecting an incoming radiation source (e.g., a laser beam) to the laser receiver and detecting a position on the light receptive surface which is impinged by the radiation source. The laser receiver further includes a processor (e.g., digital signal processor (DSP)) which is responsive to the impingement of the light receptive surface through the processing of data collected from the illuminated region of the light receptive surface and for determining the laser position (i.e., the elevation of the laser) therefrom. That is, in accordance with an embodiment, laser light striking the light receptive surface will illuminate a particular section of the light receptive surface which will be detected and observed by the image sensor and provided as input to the digital signal processor which will execute vision recognition steps to determine the position of the radiation strike on the illuminated light receptive surface and, in turn, determine the precise elevation of the laser.

In accordance with an embodiment, the laser receiver is further able to determine any tilt (i.e., the tilt angle) in the laser receiver. In accordance with this embodiment, given the fixed geometry of the light receptive surface and its associate mathematical characteristics, adjustments and compensations are made as a function of the angle of the plane on which the laser strikes the light receptive surface thereby allowing for the determination of the tilt angle.

The various embodiments disclosed herein are directed to either so-called "reflective" embodiments in that the laser plane and associated observation and detecting of the laser beam striking the light receptive surface occurs on the outside (i.e., the exterior) of the light receptive surface, or so-called "transmissive" embodiments where the laser plane and associated observation and detecting of the laser beam striking the light receptive surface occurs on the inside (i.e., the interior) of the light receptive surface. Notwithstanding these somewhat different physical characteristics between the disclosed reflective and transmissive embodiments it will be understood that the image processing (as detailed herein below) is the same for both embodiments.

These and other advantages of the embodiments will be apparent to those of ordinary skill in the art by reference to the following detailed description and the accompanying drawings.

DETAILED DESCRIPTION

In accordance with various embodiments, a vision laser receiver is disclosed having a light receptive surface such that laser light received at the light receptive surface will illuminate a particular section of the light receptive surface (i.e., will be visible, observable and/or detectable). Illustratively, the light receptive surface has a defined geometry and is light receptive. An image sensor will detect and observe the illumination of the light receptive surface and determine a precise position (e.g., vertical position) of such illuminated section on the light receptive surface. The elevation of the laser can then be determined from such detected position.

Figure 1:
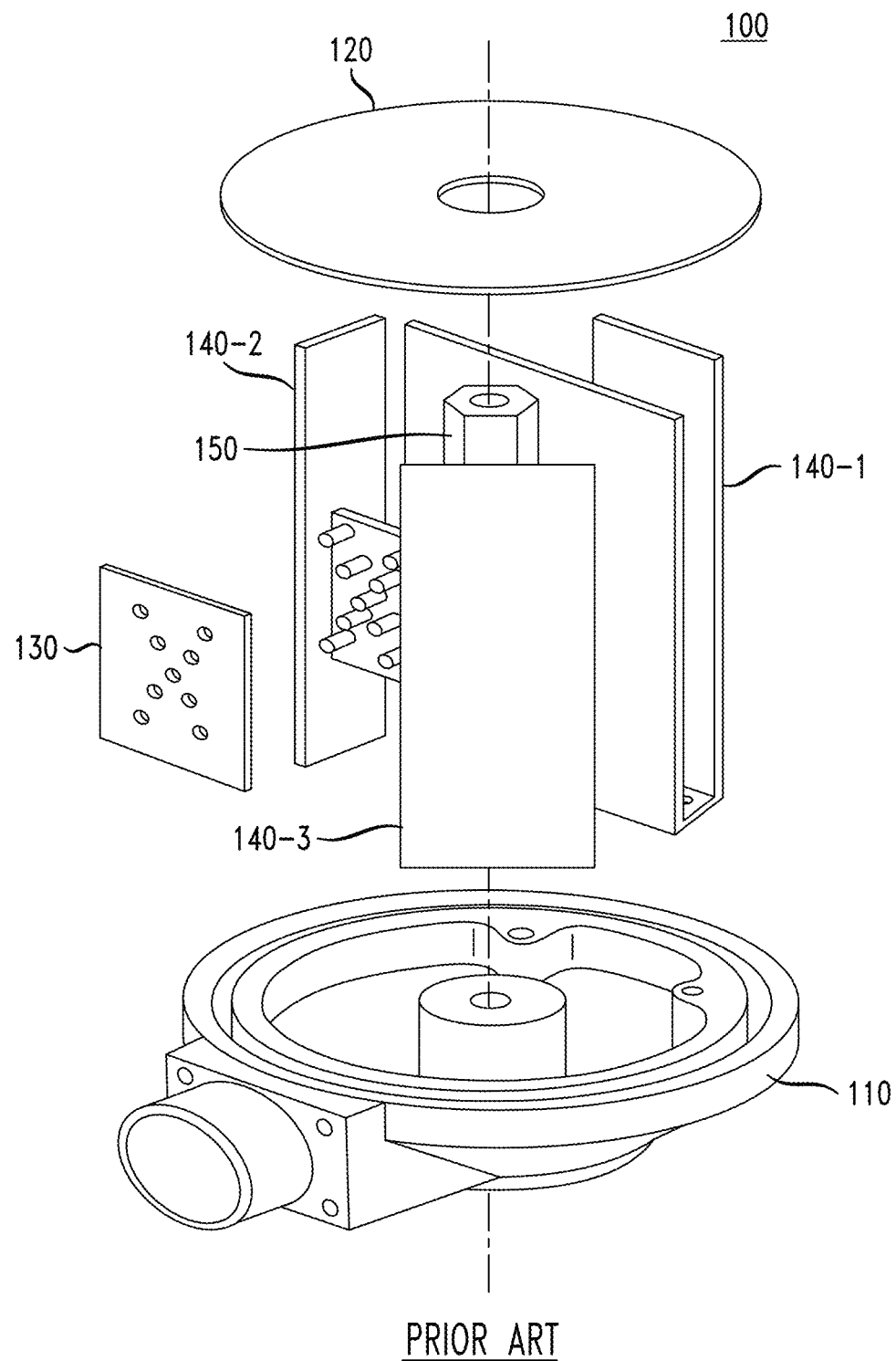
FIG. 1 shows an exploded view of a conventional laser receiver.

FIG. 1 shows an exploded view of a conventional laser receiver. As shown, laser receiver 100 is used in a variety of applications such as on construction or agricultural sites and is typically mounted on a machine (e.g., a dozer) for 360 degree receiving, or mounted on a surveying pole or carried by the housing for handheld applications. An example of one such commercially available laser receiver is the Topcon LS-B2 laser receiver (part of the LS Series machine mounted laser receivers) available from Topcon Corporation. Laser receiver 100 has a housing top 120, housing base 110, LED panel 130 and a mounting post 150. Configured around mounting post 150 is a series of light sensors, in particular, individual light senor arrays 140-1, 140-2, and 140-3 which are symmetrically placed in a circular fashion to enable 360 degree laser receiving of an incoming laser beam from a laser transmitter (or radiation source). As will be appreciated, and while not shown in FIG. 1, each light sensing array will have multiple individual photo detectors and multiple circuit boards and connectors for the individual sensor arrays 140-1, 140-2, and 140-3. Laser receivers, such laser receiver 100, deliver excellent precision and are widely used but their design requirements tend to increase factors such as part count, mechanical and electrical complexity, and cost.

Figure 2:
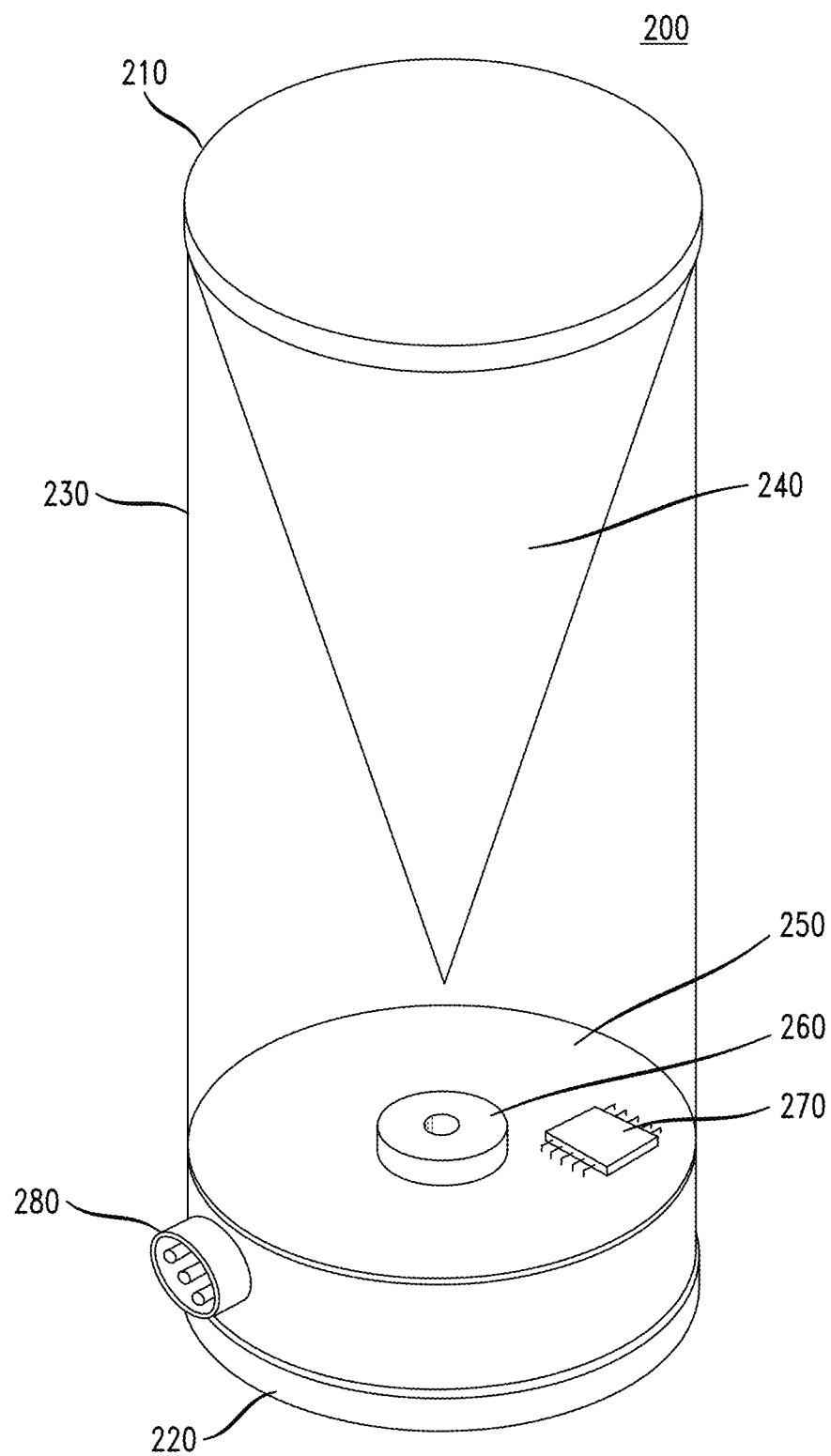
FIG. 2 shows an assembled view of a laser receiver configured for a reflective mode of operation in accordance with an embodiment.

FIG. 2 shows a fully assembled view of laser receiver 200 configured in accordance with an embodiment. As shown, laser receiver 200 has a housing 230, housing top 210, housing base 220 and power and data connector 280 built into housing base 220. Housing 230 is illustratively constructed to include a fully transparent portion to allow for the detection of laser light. In an alternative embodiment, the transparent housing may be dyed (e.g., red) to allow light of a desired wavelength to pass and block other wavelengths in a well-known fashion. In this way, the dyed transparent housing will eliminate the need for image sensor 260 to filter out any unwanted light. Configured within housing 230 is light receptive surface 240 having a fixed geometric shape and traversing substantially the entire length of housing 230. Light receptive surface 240 is illustratively shown as having a cone shape in accordance with the embodiment but it will be understood that other geometric shapes can be used including, but not limited to, cylinders, rectangles, spheres ellipsoids, or paraboloids. The main requirements for selecting the shape of light receptive surface 240 are directed to having a fixed geometric shape, light receptive qualities and size depending on the overall physical footprint desired for the receiver. The fixed geometry and light receptivity will allow for elevation and/or tilt determination as detailed herein below in accordance with various embodiments.

Laser receiver 200 is further configured to include image sensor 260, illustratively, a camera, charge-coupled device (CCD) or CMOS image sensor for observing and detecting a source of incoming radiation (e.g., a laser beam) to laser receiver 200 and detecting impingement by the incoming radiation on light receptive surface 240. Laser receiver 200 further includes processor 270 (e.g., digital signal processor (DSP)) which is responsive to the impingement and illumination of light receptive surface 240 and for analyzing the illumination to accurately determine the laser position (i.e., the elevation and tilt of the laser). Illustratively, image sensor 260 and processor 270 are mounted on circuit board 250 in a well-known fashion. As such, in accordance with an embodiment, laser light will illuminate a particular section of light receptive surface 240 which will be detected and observed by image sensor 260 and provided as input to processor 270 which will execute well-known vision recognition steps to determine the position of the radiation strike on light receptive surface 240 and, in turn, determine the precise elevation of the laser. Further details of laser receiver 200 and the determination of laser elevation and/or tilt in accordance with various embodiments will now be discussed.

Figure 3A:
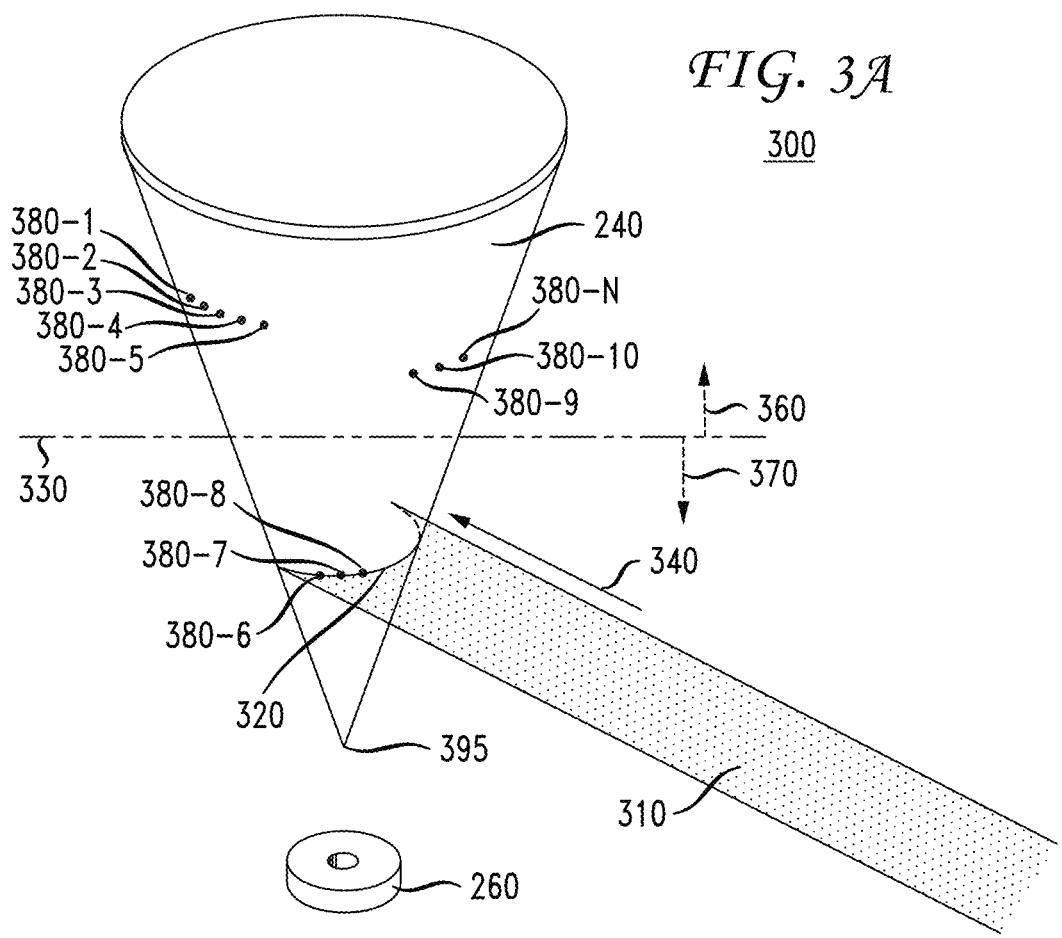
FIG. 3A and FIG. 3B show an exploded view of the light receptive surface and image sensor of the laser receiver of FIG. 2 with an incoming laser beam in accordance with an embodiment.
Figure 3B:
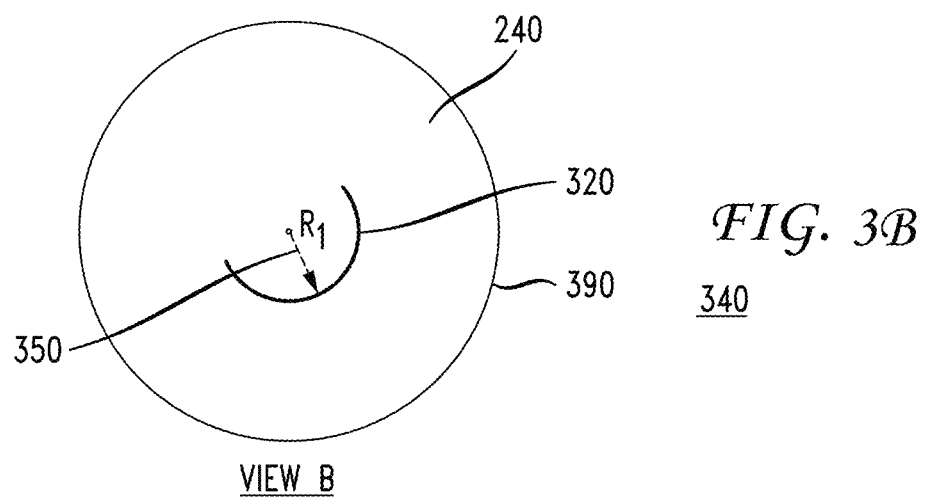

FIG. 3A and FIG. 3B show an exploded view 300 of light receptive surface 240 and image sensor 260 of laser receiver 200 as shown in FIG. 2. In FIG. 3A, laser plane 310 is shown which strikes light receptive surface 240 from a particular direction 340. As will be understood, laser plane 310 is generated by a laser transmitter capable of generating visible laser light. Such laser transmitters are well-known and may be stationary or rotating lasers. For example, one such commercially available laser is the Topcon RL-H4C construction laser available from Topcon Corporation. The laser receiver of the various embodiments described herein is capable of being utilized with any type of visible laser source. Laser plane 310 strikes light receptive surface 240 below centerline 330 thereby illuminating and forming intersection curve 320 on light receptive surface 240, that is, the intersection of laser plane 310 with light receptive surface 240.

For furthering the understanding of the present disclosure, FIGS. 3A, 3B, 4A, and 4B will be discussed together with the main difference in the described embodiments being where (i.e., below or above) the laser plane strikes the respective light receptive surface. That is, in the FIGS. 3A/3B depiction laser plane 310 strikes light receptive surface 240 below centerline 330 thereby illuminating and forming intersection curve 320 on light receptive surface 240, that is, the intersection of laser plane 310 with light receptive surface 240. In the FIGS. 4A/4B depiction, laser plane 410 is projected on (or at) light receptive surface 240 from direction 440 and at a point above (see, directional arrows 460 and 470, respectively, indicating above and below directions) centerline 430.

As shown in the embodiment of FIG. 3A and FIG. 3B, given the defined geometric shape and configuration of light receptive surface 240, the illumination of light receptive surface 240 will result in a projection of intersection curve 320 in a defined manner as prescribed by the geometric shape of light receptive surface 240, here, the shape of a cone. More particularly, laser light from laser plane 310 striking the cone shape of light receptive surface 240 will result in intersection curve 320 having an arc shape. In this embodiment, as shown, light receptive surface is a substantially vertical orientation (i.e., no tilt). That is, the illumination of light receptive surface 240, having a cone shape, will manifest as an arc given this orientation. As such, in this embodiment, light receptive surface 240 is analogous to a projection screen (e.g., in a movie theater) such that the light is projected on to the surface and is thereby detectable and observable, for example, by image sensor 260. That is, light receptive surface 240 has a plurality of pixels 380-1, 380-2, 380-3, 380-4, 380-5, 380-6, 380-7, 380-8, 380-9, 380-10 through 380-N that are mathematically defined in a contiguous manner across light receptive surface 240 which are representative of the light projected onto the surface by laser plane 310. To further the description and understanding of this feature, FIG. 3B shows a bottom view 340 (also designated as View B on FIG. 3B) of light receptive surface 240 which illustrates the arc shape of intersection curve 320 having radius $R_1$ 350 (resulting from circular pattern 390 that is illuminated given that laser plane 310 strikes light receptive surface 240 in a parallel fashion to base 395 of light receptive surface 240). As will be appreciated, the conical shape of light receptive surface presents certain characteristics that can be exploited in determining laser elevation in accordance with the embodiment.

Figure 4A:
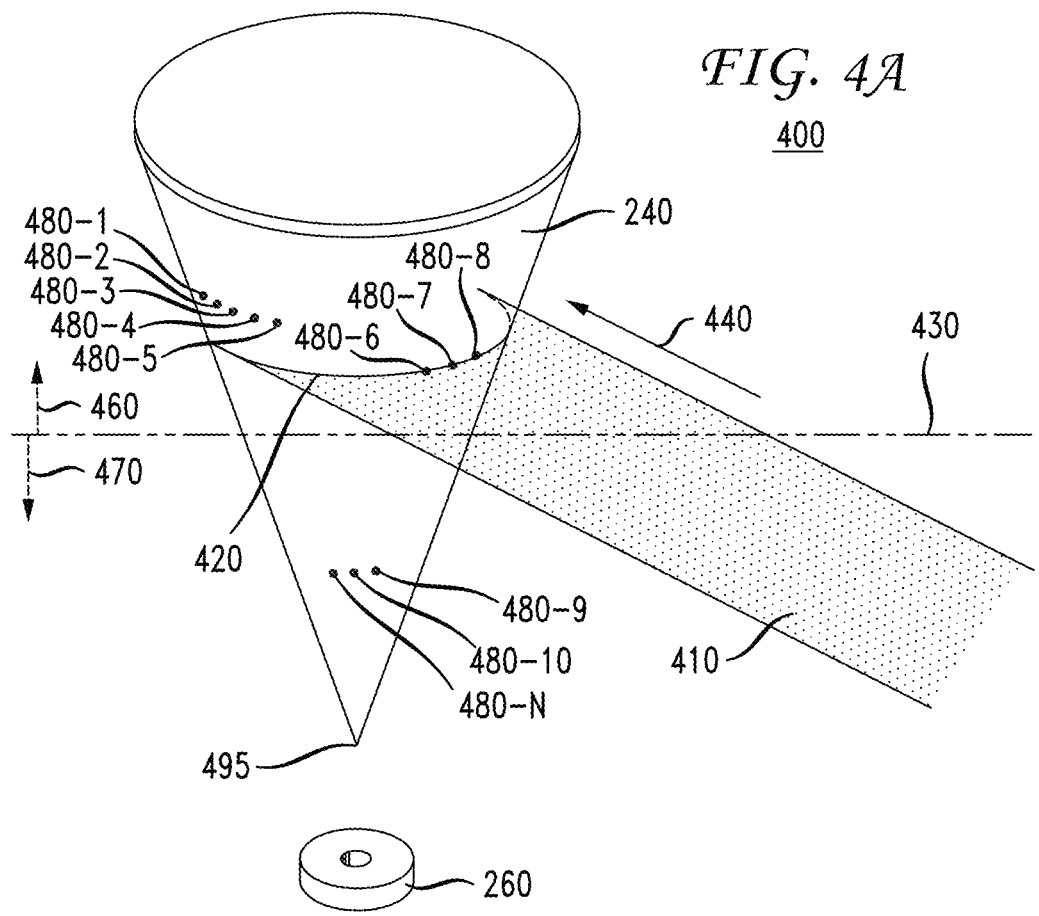
FIG. 4A and FIG. 4B show an exploded view of the light receptive surface and image sensor of the laser receiver of FIG. 2 with an incoming laser beam in accordance with an embodiment.
Figure 4B:
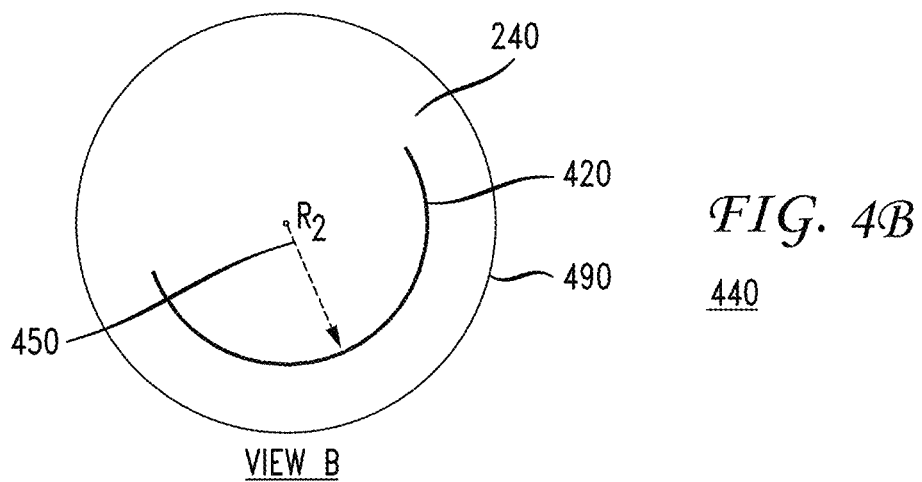

Similar to the above-described embodiment, the embodiment of FIG. 4A and FIG. 4B further illustrates the advantages of the disclosed vision laser receiver. In this embodiment, laser plane 410 is projected on (or at) light receptive surface 240 from direction 440 and at a point above (see, directional arrows 460 and 470, respectively, indicating above and below directions) centerline 430. Again, given the defined geometric configuration of light receptive surface 240 the illumination of light receptive surface 240 will produce intersection curve 420 in a defined manner as prescribed by the geometric shape of light receptive surface 240, here, the shape of a cone. More particularly, laser light from laser plane 410 striking the conical shape of light receptive surface 240 will result in intersection curve 420 having an arc shape. Again, light receptive surface 240 has a plurality of pixels 480-1, 480-2, 480-3, 480-4, 480-5, 480-6, 480-7, 480-8, 480-9, 480-10 through 480-N that are mathematically defined in contiguous manner across light receptive surface 240. FIG. 4B shows bottom view 440 (designated as View B on FIG. 4B) of light receptive surface 240 which illustrates the arch (or conic) shape of intersection curve 420 having radius $R_2$ 450 (resulting from circular pattern 490 that is illuminated given that laser plane 410 strikes light receptive surface 240 in a parallel fashion to base 495 of light receptive surface 240). As will appreciated from the discussion above, intersection curve 420 is of a larger radius than intersection curve 320 (see FIGS. 3A and 3B) given the projected laser beam was in a region of light receptive surface 240 that lies above centerline 430. This can also be determined by a comparison of radius $R_2$ 450 and radius $R_1$ 350 (see, FIG. 3B), respectively.

That is, given the conical shape of light receptive surface 240 the intersection curves (e.g., intersection curve 320) produced by a received laser beam (e.g., from laser plane 310) will have known, quantifiable geometric and location characteristics that can be used, in conjunction with well-known vision algorithms or computer vision techniques, to determine elevation. For example, given that the light of the laser on the surface will be at a different brightness, in accordance with an embodiment, an edge detection algorithm can be used to isolate the arc of the laser from the background. This will provide a group of pixels with corresponding x and y coordinates that represent the arc of the laser. Alternatively, an algorithm that finds the middle of the mass of the laser arc can be used to provide a more precise x and y coordinate representation of the arc. Once the x and y coordinates are known that describe the arc, this information can be combined with a knowledge of the shape that the laser is striking such that the radius of the arc (or focal points if elliptical in shape) can be determined. This information would allow one to determine the elevation and tilt of the laser including as further detailed herein below in FIG. 5A and FIG. 5B directed to an embodiment involving tilt of the laser receiver. Laser light projected on light receptive surface 240 that is below centerline 330 (see, directional arrow 370) will produce intersection curves having a smaller radius than that of laser light above centerline 330 (see, directional arrow 360). As will be appreciated, radius $R_1$ 350 of intersection curve 320 will be smaller than that of an intersection curve resulting from a laser light above centerline 330 as will be further illustrated herein below.

In accordance with the embodiment shown, intersection curve 320 will be illuminated and detected by image sensor 260. For ease of illustration, intersection curve 320 is shown encompassing three (3) pixels, namely pixels 380-6, 380-7 and 380-8, but it will be understood that the intersection curve line will encompass pixels over the entire length of the illuminated light receptive array region, for example the entire arc of intersection curve 320. Information about intersection curve 320 detected by image sensor 260 will be used as input to processor 270 (see, FIG. 2) which will use well-known vision recognition operations to determine the position of the received laser beam on light receptive surface 240 and, in turn, determine the precise elevation of the laser.

As will be understood, given the fixed geometrical shape of light receptive surface 240, the location of the plurality of pixels 380-1 through 380-N can be determined in a fixed coordinate system to facilitate the determination of the location of the laser beam on light receptive surface 240 (i.e., how far up or down the incoming laser beam is on the light receptive surface) which, in turn, allows for the determination of the elevation itself. As will be understood, the production calibration of the laser receiver would consist of having a laser strike the light receptive surface at known elevations and having the image sensor store mathematical constants to adjust its interior arc fitting formulas so that the known arc matches the known elevation of the calibration laser strike. This could be done for several elevations along the length of the surface to accommodate for variances in assembly of the image sensor. Notability, no field calibration of the laser receiver is necessary in any of the embodiments herein but can be optionally utilized.

In accordance with the embodiment shown in FIGS. 4A and 4B, the illumination of intersection curve 420 will be observed and detected by image sensor 260. For ease of illustration, intersection curve 420 is shown encompassing three (3) pixels, namely pixels 480-6, 480-7 and 480-8, but it will be understood that the intersection curve line will encompass pixels over the entire length of the illuminated sensing array region, for example, the entire arc line of intersection curve 420. As before, information about intersection curve 420 detected by image sensor 260 will be used as input to processor 270 (see, FIG. 2) which will use well-known vision recognition operations, as detailed herein above, to determine the position of the received laser beam on light receptive surface 240 and, in turn, determine the precise elevation of the laser.

Advantageously, as detailed above, a laser receiver is realized that provides a streamlined mechanical and electrical design, reduced cost, and increased reliability without sacrificing any precision or accuracy.

Figure 5A:
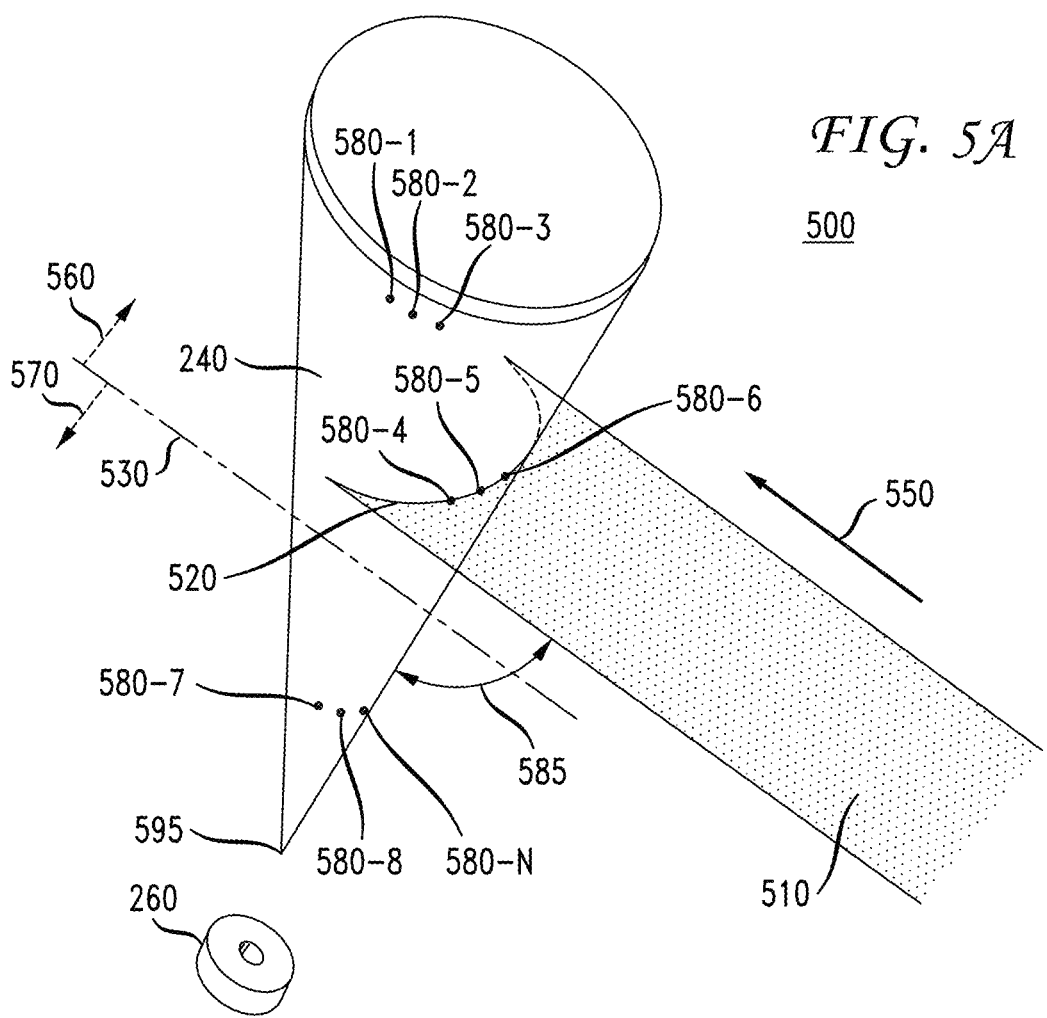
FIG. 5A and FIG. 5B show an exploded view of the light receptive surface and image sensor of the laser receiver of FIG. 2 with an incoming laser beam in accordance with an embodiment where the laser receiver is tilted.
Figure 5B:
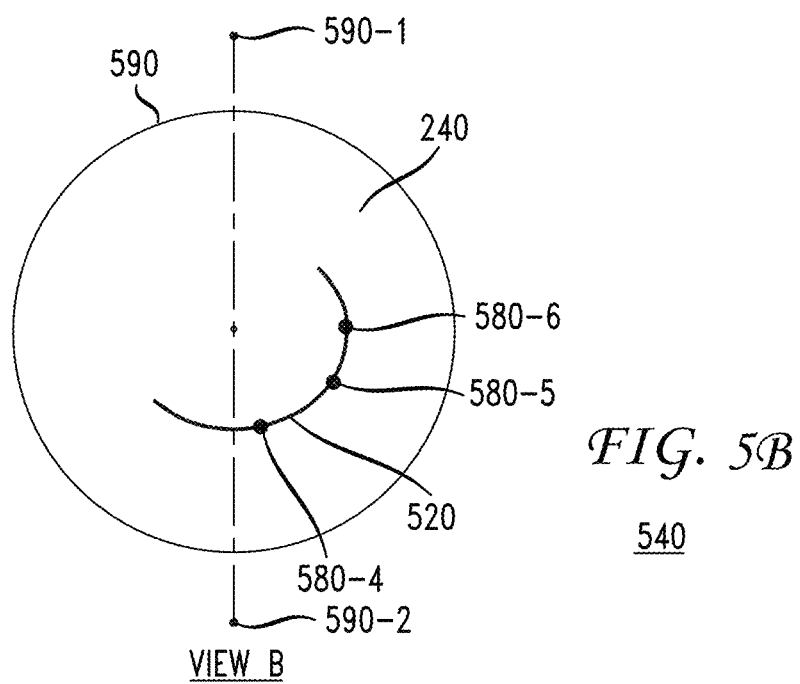

In addition to determining the elevation of a laser, the tilt of the laser receiver can also be determined as shown in the further embodiment of FIG. 5A and FIG. 5B. In this further embodiment, exploded view 500 shows laser plane 510 is projected on (or at) light receptive surface 240 at a point above centerline 530 (see, directional arrows 560 and 570, respectively indicating above and below directions). As shown, in this embodiment the laser light from laser plane 510 is not parallel to base 595 of light receptive surface 240 thereby defining angle 585 in the received laser beam from laser plane 510 on light receptive surface 240. Again, the defined geometric configuration of light receptive surface 240 the illumination of light receptive surface 240 will produce intersection curve 520 in a defined manner as prescribed by the geometric shape of light receptive surface 240, here, a conical shape. More particularly, laser light from laser plane 510 striking the conical shape of light receptive surface 240 will result in intersection curve 520 having an elliptical shape. That is, the illumination of light receptive surface 240, having a cone shape, will manifest as an ellipse due to the angle of the strike and the tilt of the laser receiver. This is different from the embodiments described herein above (see, FIGS. 3A, 3B, 4A, and 4B) where the laser plane is parallel the base of light receptive surface 240 and renders a circular shape.

Advantageously, in addition to the elevation determination, in accordance with this further embodiment, the tilt of the laser receiver is also determined utilizing circular pattern 590 as illuminated by laser plane 510. As will be understood, the intersection of laser plane 510 with light receptive surface 240 is, in geometric terms, an intersection of a plane with a cone which results in an ellipse being transcribed along the cone by the plane. The resulting ellipse and its associated mathematical properties such as foci, vertices and eccentricity taken in combination with the known mathematical properties of the cone shape facilitates the determination of the angle at which the laser plane is with respect to the laser receiver in accordance with the above-described embodiments.

Certain of the embodiments detailed herein may require certain alignment correction from time-to-time (see, e.g., FIG. 3 and FIG. 4). As in those previous embodiments, light receptive surface 240 has a plurality of pixels 580-1, 580-2, 580-3, 580-4, 580-5, 580-6, 580-7, 580-8 through 580-N that are contiguous across light receptive surface 240. FIG. 5B shows bottom view 540 (designated as View B on FIG. 5B) of light receptive surface 240 which illustrates circular pattern 590 of intersection curve 520 having foci $F_1$ 590-1 and foci $F_2$ 590-2 (resulting from circular pattern 590 that is illuminated given that laser plane 510 is received by light receptive surface 240 at an angle to base 595 of light receptive surface 240).

In accordance with the embodiment shown in FIGS. 5A and 5B, the illumination of intersection curve 520 will be observed and detected by image sensor 260. For ease of illustration, intersection curve 520 is shown encompassing three (3) pixels, namely pixels 580-4, 580-5 and 580-6, but it will be understood that the intersection curve line will encompass pixels over the entire length of the illuminated light receptive array region, for example, the entire elliptical line of intersection curve 520. As before, information from the illumination of intersection curve 520 detected by image sensor 260 will be used as input to processor 270 (see, FIG. 2) which will use well-known vision recognition operations to determine the position of the radiation strike on light receptive surface 240 and, in turn, determine the precise elevation of the laser.

Figure 6:
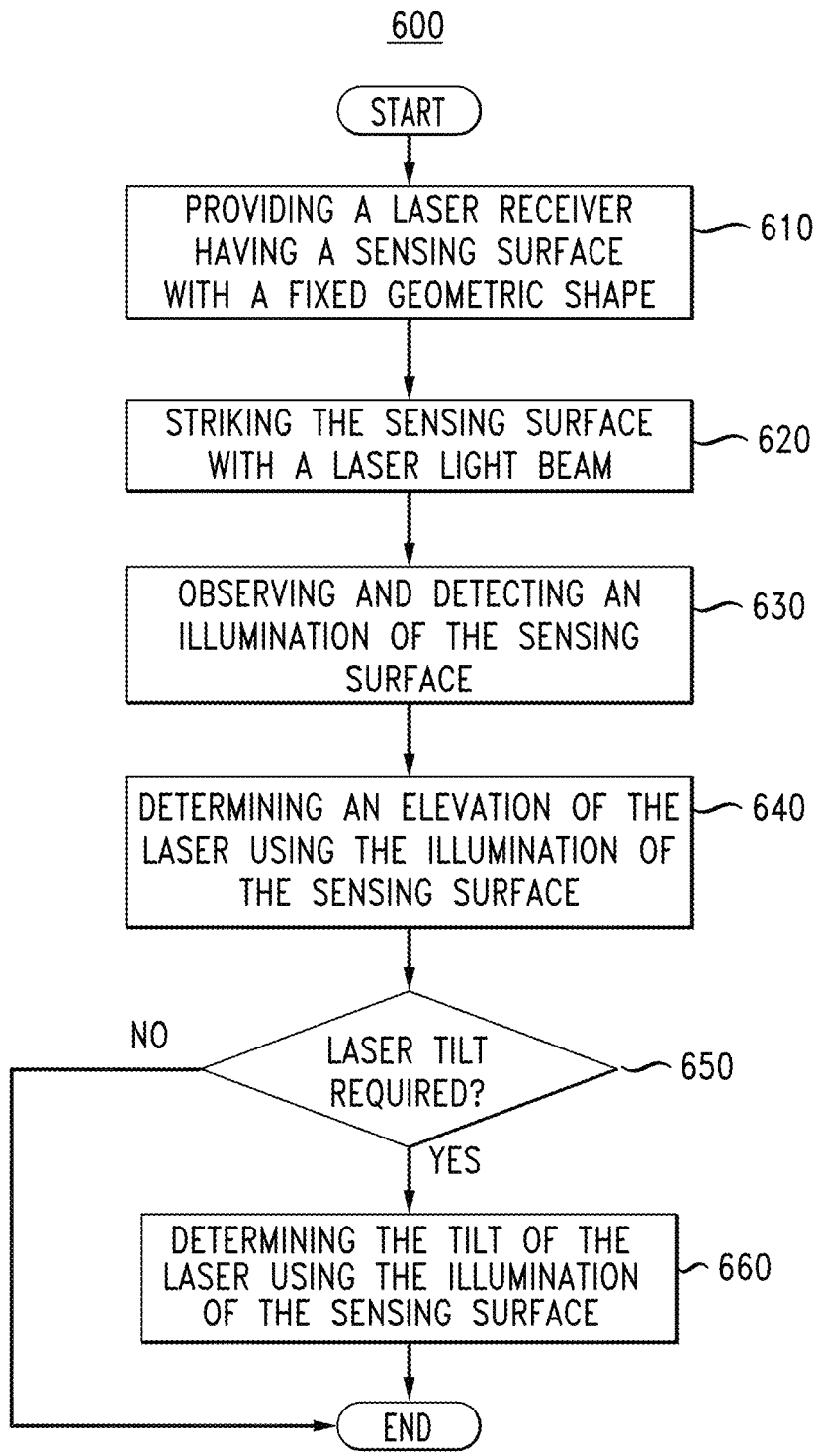
FIG. 6 shows a flowchart of illustrative operations for determining an elevation and tilt in accordance with an embodiment.

FIG. 6 shows a flowchart of illustrative operations 600 for determining elevation and tilt angle in accordance with an embodiment. More particularly, step 610 details receiving a laser beam at a light receptive surface which illuminates a defined intersection curve in the light receptive surface whereby observing and detecting an illumination of the light receptive surface (step 620) will identify the intersection curve. As noted herein, such detection can be in accordance with either of the reflective or transmissive embodiments as disclosed herein. The light receptive surface is illustratively a cone shaped surface such as light receptive surface 240 as shown in FIG. 2. As detailed above, this sensing can be accomplished using an image sensor in the same field of vision as the light receptive surface and that monitors the light receptive surface.

From the intersection curve illuminated in the light receptive surface, step 630 details determining an elevation of the laser from the illumination of the light receptive surface. As detailed above, the precise elevation of the laser is determined using well-known vision algorithms that will calculate a location of the received laser light on the light receptive surface and, in turn, calculate the elevation of the laser therefrom. In accordance with an alternative embodiment, if the laser tilt is required (step 640) then determining a tilt of the laser receiver from the illumination of the light receptive surface (step 650) is accomplished as detailed above with respect to the embodiment of FIG. 5A and FIG. 5B.

Figure 7:
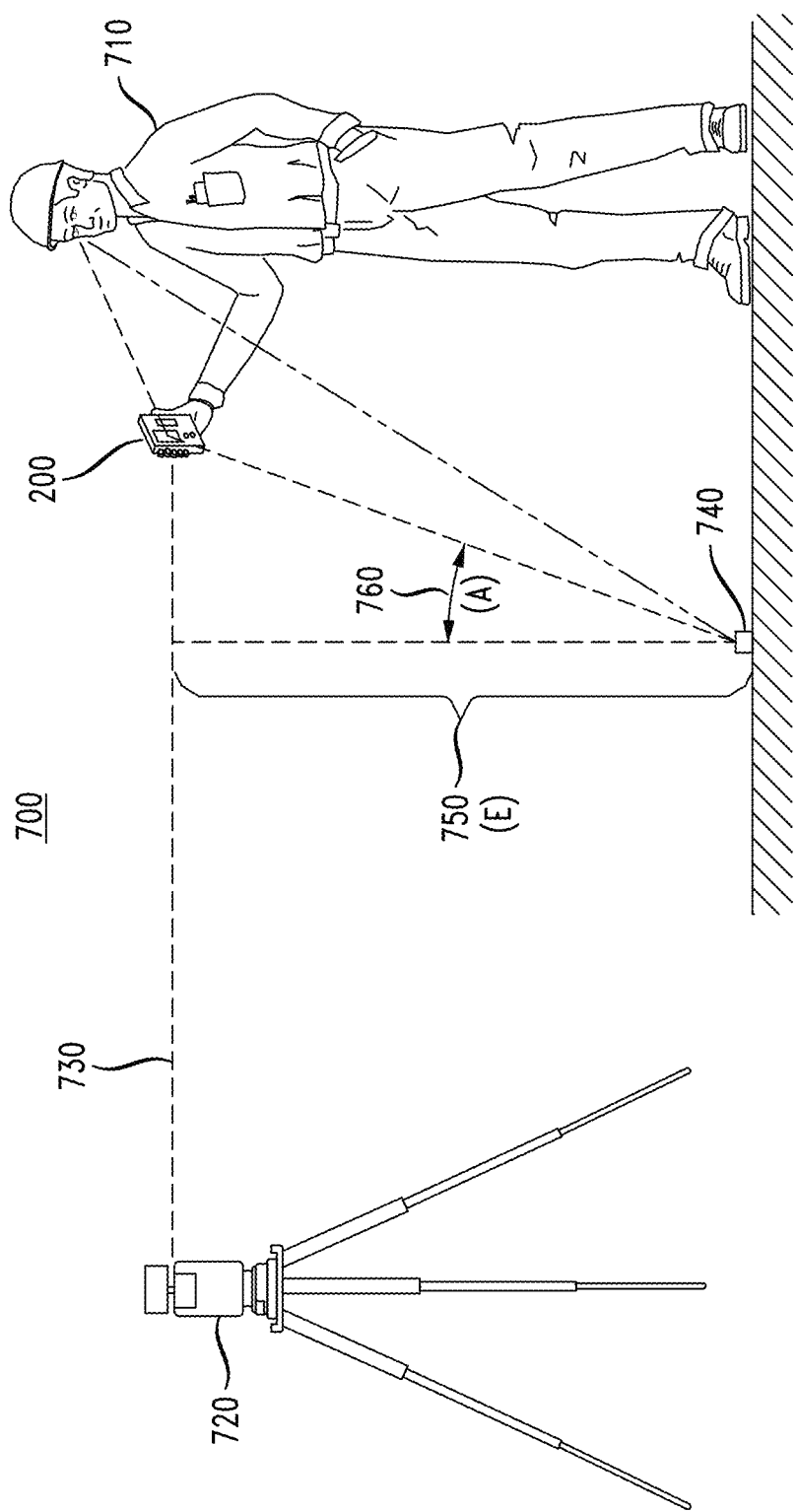
FIG. 7 shows a diagrammatic view of a user operating a laser system configured in accordance with the embodiments of FIG. 4 A/B and FIG. 5 A/B.

FIG. 7 shows a diagrammatic view of user 710 operating within laser system 700 configured in accordance with an embodiment. Illustratively, laser system 700 utilizes laser receiver 200 configured in accordance with the embodiment of FIG. 2 and pointed at a desired target (e.g., target 740) being measured. Alternatively, laser receiver 805, as described herein below, can also be utilized in a similar fashion. In this embodiment, transmitter 720 (e.g., a rotating laser) is transmitting laser plane 730 which will be received by laser receiver 200 to determine the precise elevation (E) 750 and tilt angle (A) 760 as detailed hereinabove. Of course, as will be appreciated, there are numerous applications and configurations for delivering the laser receiver and the elevation and tilt angle determination of the various embodiments. For example, user 710 may mount laser receiver 200 on a pole to increase stability when holding laser receiver 200 in the field (e.g., a construction site). Another alternative is to mount laser receiver 200 on a dozer or other construction vehicle, to name just a few. Advantageously, in accordance with various embodiments, a laser receiver configuration (and elevation and tilt determination methodology) is realized that has a streamlined mechanical and electrical design, reduced cost, and increased reliability without sacrificing any accuracy characteristics.

The above-detailed embodiments are directed to reflective embodiments in that the laser plane and associated observation and detecting of the laser beam striking the light receptive surface occurs on the outside (i.e., the exterior of) of the light receptive surface. For example, the outside of light receptive surface 240 of FIG. 2. The discussion that follows next herein below will be directed to transmissive embodiments where the laser plane and associated observation and detecting of the laser beam striking the light receptive surface occurs on the inside (i.e., the interior of) of the light receptive surface. That is, the observation and the detection of the incoming laser strike is observed and detected from a position within (i.e., inside) the light reflective surface no matter the shape (e.g., cone, rectangle, etc.). Notwithstanding these somewhat different physical characteristics between the disclosed reflective and transmissive embodiments it will be understood that the image processing (as detailed above) is the same for both embodiments. This will be highlighted further herein below in the description of the transmissive embodiments and as set forth in FIGS. 8A through 8D.

Figure 8A:
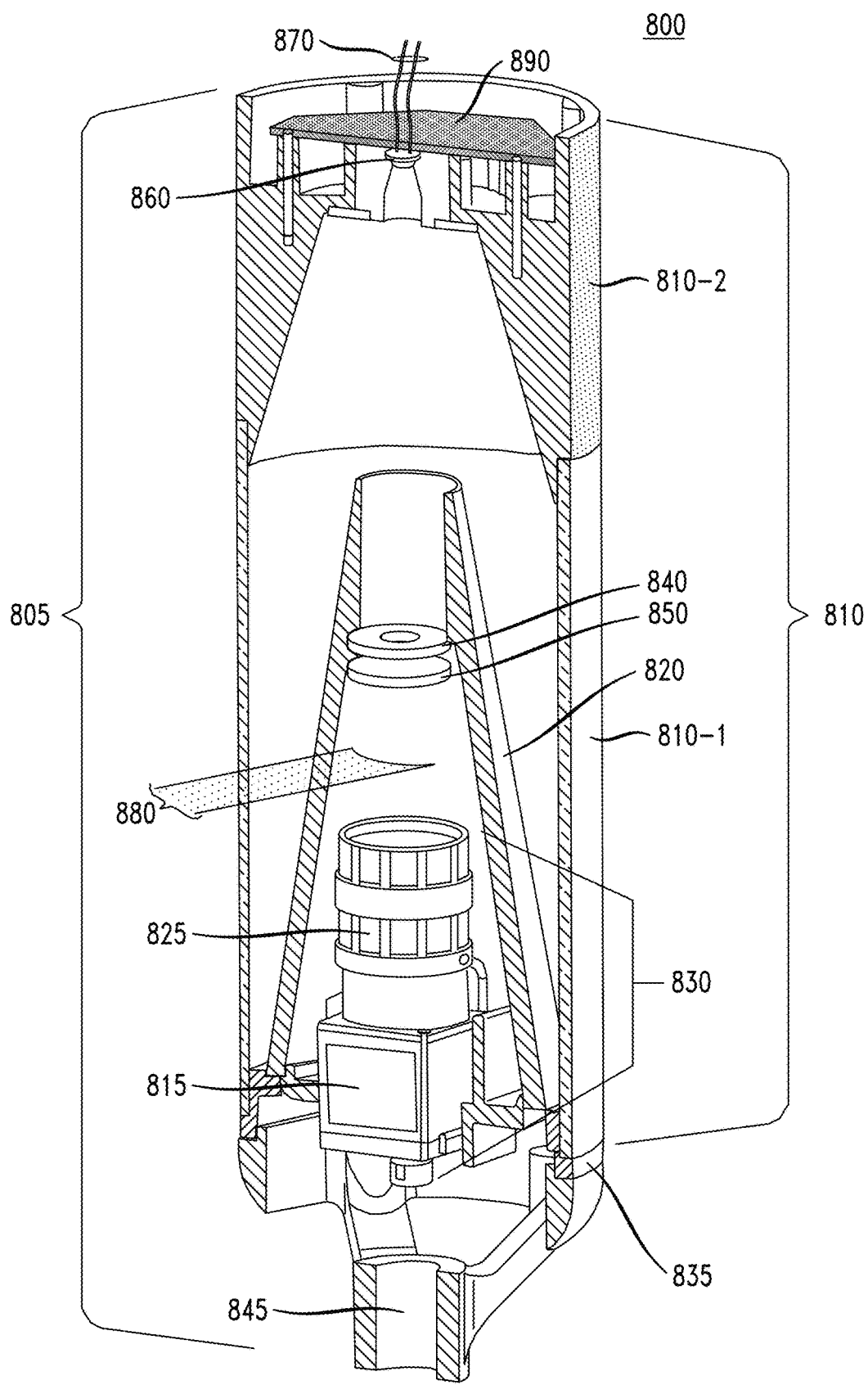
FIG. 8A shows a cross section view of a fully assembled laser receiver configured for a transmissive mode of operation in accordance with an embodiment.

FIG. 8A shows a cross section view 800 of fully assembled laser receiver 805. As shown, laser receiver 805 includes housing 810 which is comprised of transparent housing 810-1 and non-transparent housing 810-2 where transparent housing 810-1 allows for the penetration and detection of laser light. As mentioned above, in an alternative embodiment, transparent housing 810-1 may be dyed to allow light of a desired wavelength to pass and block other wavelengths in a well-known fashion. In this way, the dyed transparent housing will eliminate the need for image sensor 830 (illustratively shown as being comprised by camera 815 and lens 825 in FIG. 8A) to filter out any unwanted light. In accordance with embodiment of FIG. 8A, image sensor 830 is located inside of the cone-shaped light receptive surface 820 and is directed towards mirror element 840 which is an annular element in-line with and near photodiode 860 (see also, e.g., FIG. 8C) Mirror element 840 and filter element 850 may be glued in place to the inside area of light receptive surface 805, or in an alternative embodiment, may be molded. Alternatively, in accordance with an embodiment, filter element 850 may be removed entirely if no optical filtering is necessary.

In accordance with the embodiment shown, as laser light from laser plane 880 strikes light receptive surface 820, image sensor 830 will observe and detect a position on light receptive surface that is impinged by the laser light (i.e., radiation source) by viewing mirror element 840 and the associated image thereupon. Laser receiver 805 also includes base 890, image sensor housing 835, mounting cap 845 and photodiode 860 having a pair of leads 870 extending through base 890 which includes, illustratively, a circuit board with at least a processor mounted thereon (e.g., processor 270 as shown in FIG. 2). The operation and functionality of photodiode 860 is further detailed herein below.

Figure 8B:
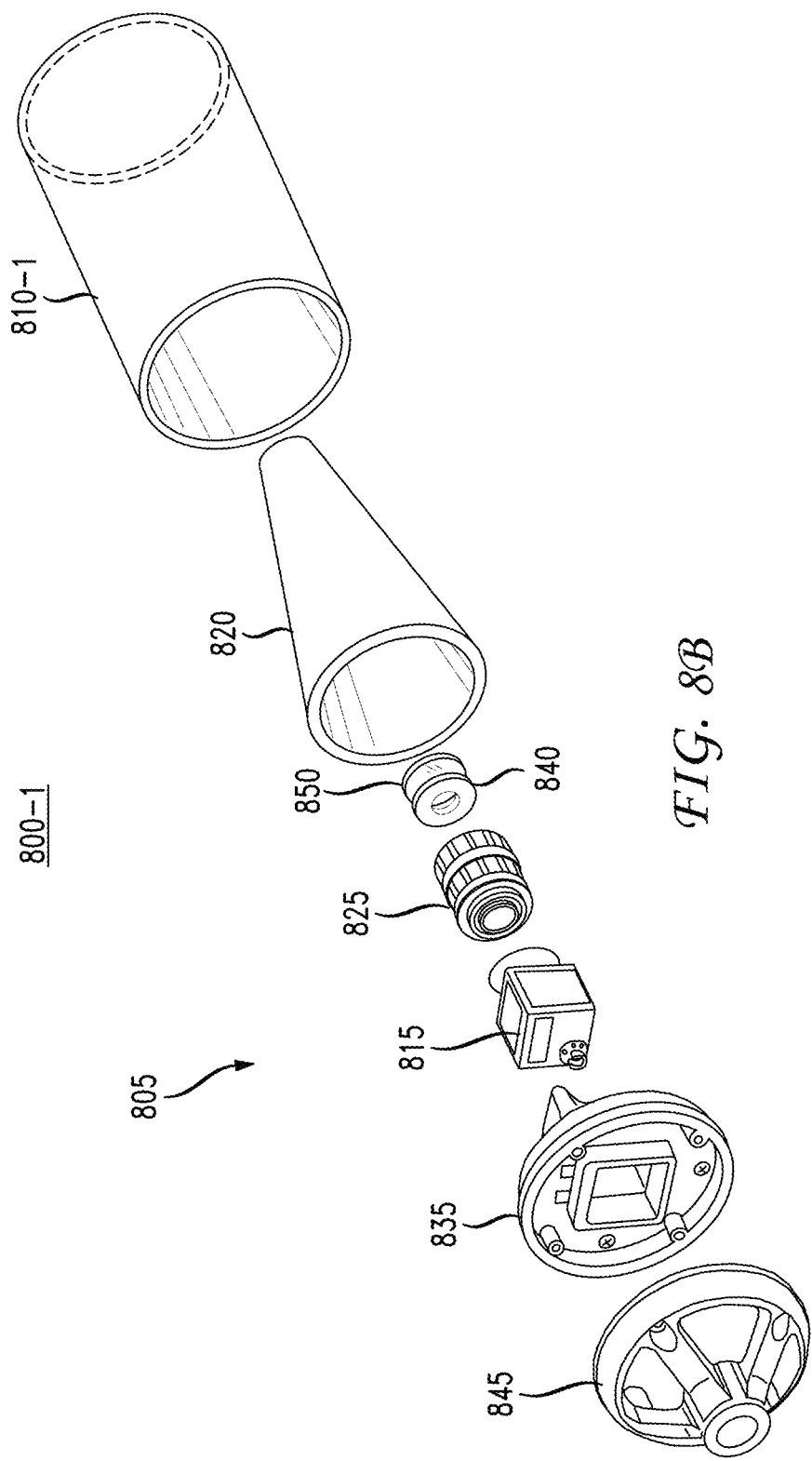
FIG. 8B shows an exploded view of the laser receiver of FIG. 8A from the perspective of the image sensor end of the laser receiver.
Figure 8C:
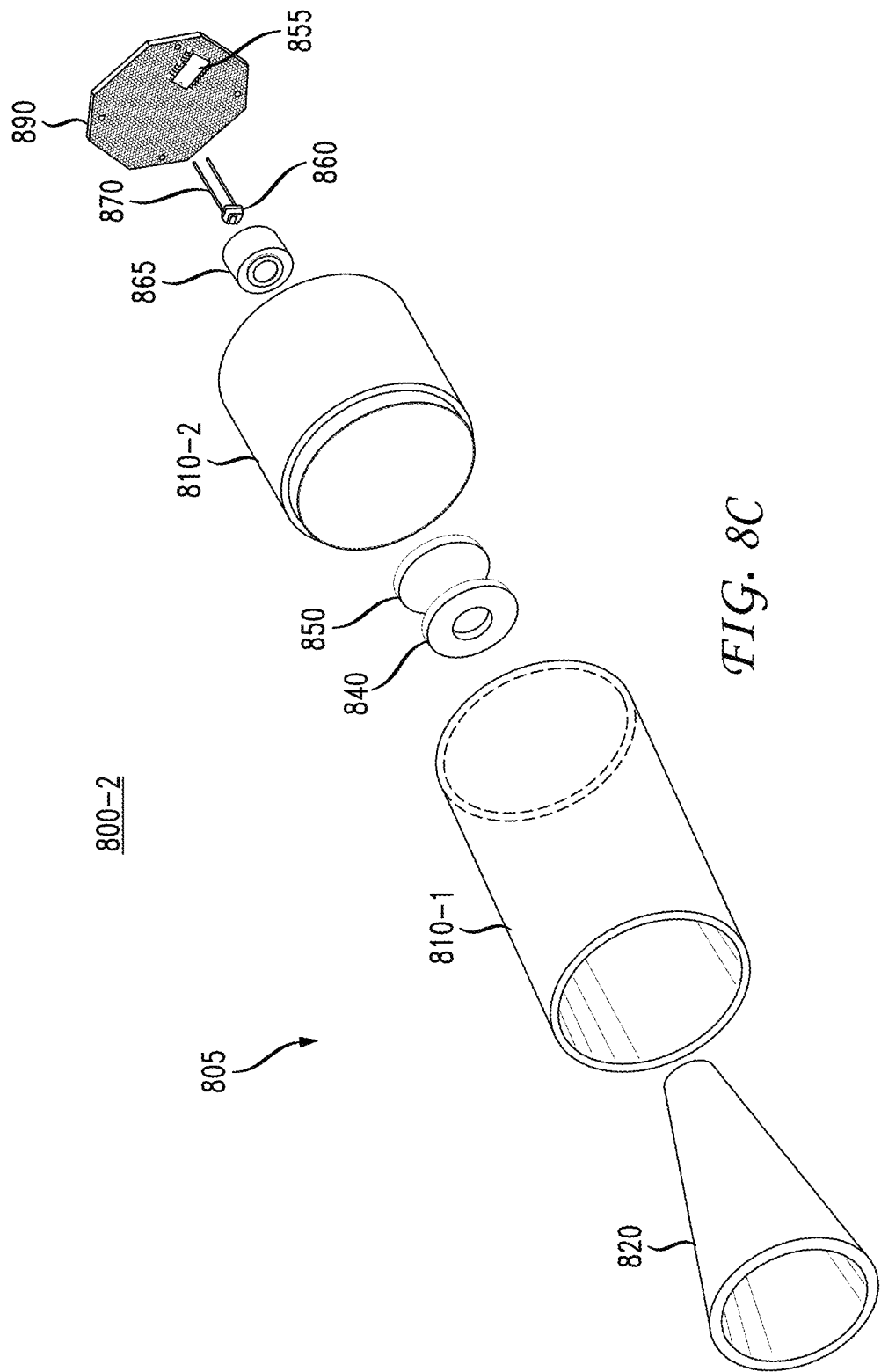
FIG. 8C shows an exploded view of the laser receiver of FIG. 8A from the perspective of the photodiode end of the laser receiver.

To further facilitate the understanding of the configuration and operation of laser receiver 805, FIG. 8B and FIG. 8C show different exploded views of laser receiver 805. In particular, FIG. 8B shows exploded view 800-1 of laser receiver 805 from the perspective of the image sensor 830 end of laser receiver 805, and FIG. 8C shows view 800-2 from the perspective of the photodiode 860 end of laser receiver 805. Camera 815 may be a small, digital camera such as the Basler Ace USB3 1300×30 digital camera as commercially available from Basler AG, Ahrensburg, Germany. As shown in FIG. 8A, laser receiver 805 is configured with mounting cap 845 and image sensor housing 835 which provides a housing for camera 815 and lens 825. Again, as shown in FIG. 8A, image sensor housing 835 is mounted to mounting cap 845 in such a way to position image sensor 830 within the inside area of image receptive surface 820 (illustratively, a cone shape) and pointing at mirror element 840 and filter element 850 which are each mounted respectively within the inside area of image receptive surface 820. Image receptive surface 820 is affixed to the underside of image sensor housing 835 and within transparent housing 810-1.

FIG. 8C shows exploded view 800-2 of laser receiver 805 from the perspective of the photodiode 860 end of laser receiver 805. As shown, laser receiver 805 is configured with light receptive surface 820 which fits inside transparent housing 810-1. In turn, in accordance with the embodiment shown in FIG. 8C, laser receiver 805 includes mirror element 840, illustratively shown as an annular flat mirror, which allows for the present configuration of laser receiver 805 whereby image sensor 830 is configured within light receptive surface 830. As such, as will be understood, mirror element 840 increases the focal length of camera 815 such that camera 815 can observe and detect, in the mirror element 840, an incoming light beam to light receptive surface. In a further embodiment, mirror element 840 can be configured as a concave mirror to provide for a so-called "powered surface" for further enhancement of the observation taking place at the mirror element 840 by image sensor 830.

Laser receiver 805, in accordance with the embodiment shown in FIG. 8C, further comprises compound parabolic concentrator 865 configured in front of photodiode 860 having leads 870 which are mounted into base 890 which, illustratively, includes at least processor 855. Such configuration allows for enhancing the synchronization between the incoming laser strike and triggering of the shutter of camera 815 in capturing the image in the annular mirror (i.e., mirror element 840). That is, as will be readily understood, a certain level of ambient light surrounding laser receiver 815 (e.g. sunlight) that may penetrate transparent housing 810-1 substantially contemporaneously with the light beam from laser plane 880 may decrease the efficiency of capturing the laser strike in annular mirror 85 by camera 815. As such, in accordance with the embodiment, concentrator 865 improves the light gathering capability of photo diode 860 which is essentially performing exposure management to minimize the exposure duration and synchronize the shutter of camera 815 with the incoming laser beam. So, photodiode 860 is detecting a flash of light (i.e., the incoming laser beam strike) and signaling camera 815 to open its shutter at a specific time in order to match the camera's open shutter with the laser strike.

Figure 8D:
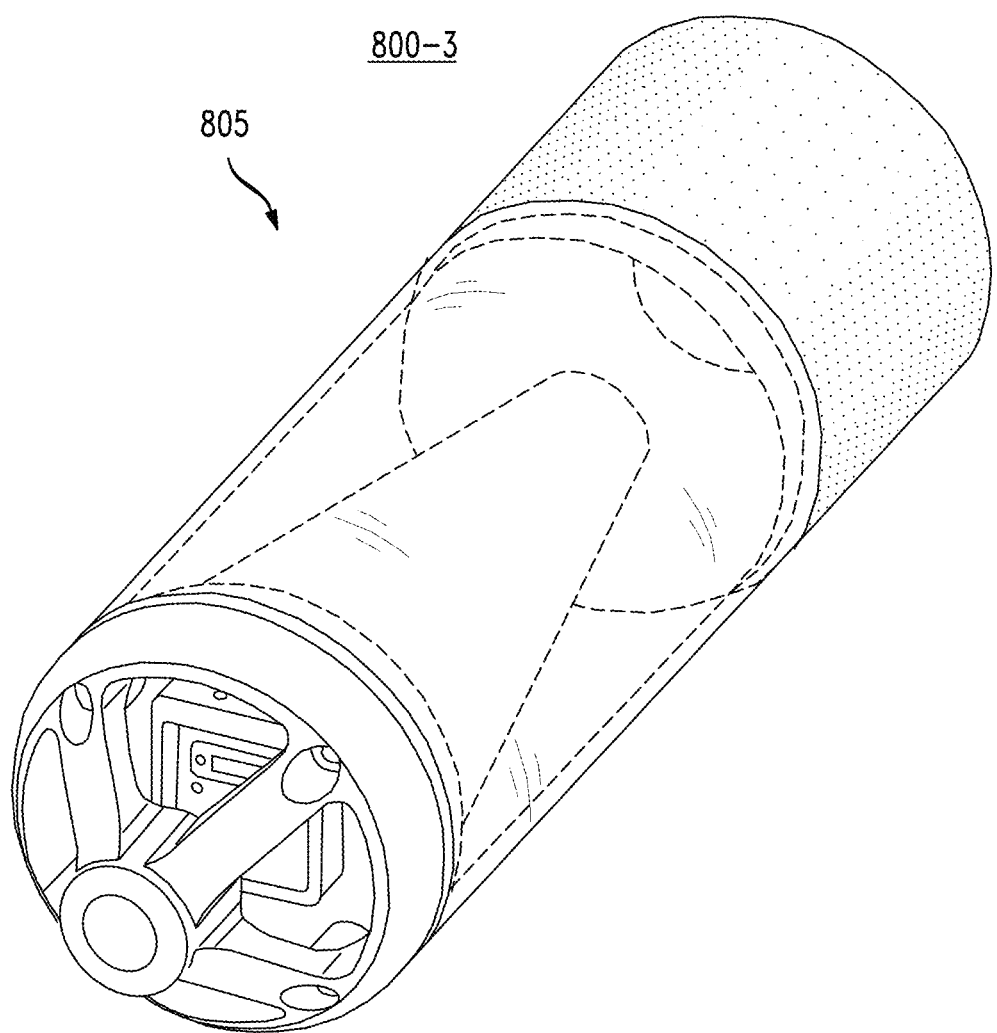
FIG. 8D shows a fully assembled view of the laser receiver of FIGS. 8A-8C.

Again, as detailed above, the embodiments of FIGS. 8A-8D are directed to transmissive embodiments where the laser plane and associated observation and detecting of the laser beam striking the light receptive surface occurs on the inside (i.e., the interior of) of the light receptive surface. To this end, FIG. 8D shows a fully assembled view 800-3 of laser receiver 805 in accordance with such transmissive embodiments. Notwithstanding the somewhat different physical characteristics between the disclosed reflective and transmissive embodiments it will be understood that the image processing (as detailed above) is the same for both embodiments.

Figure 9:
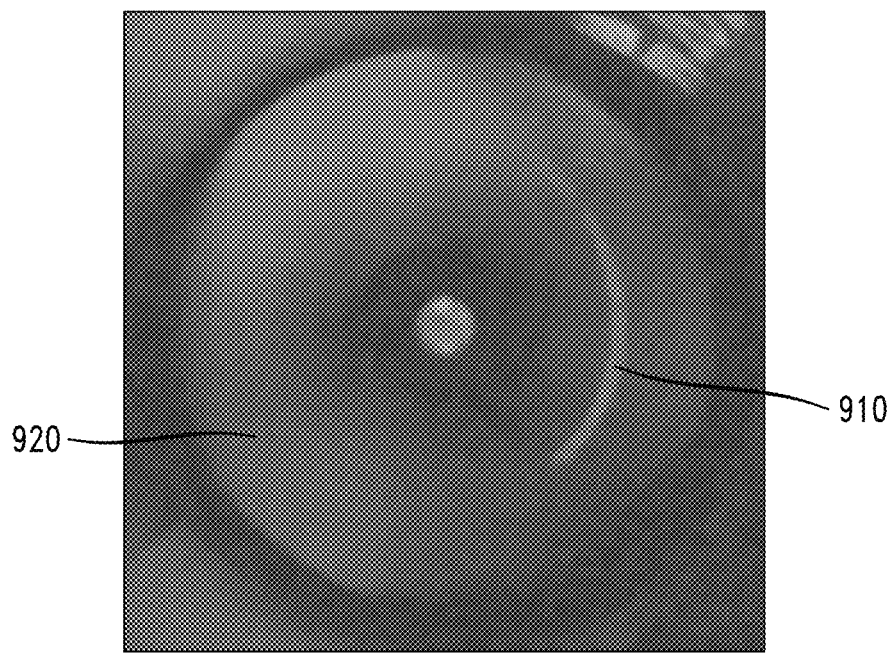
FIG. 9 shows a photograph image of a laser receiver configured in accordance with FIGS. 8A-8D incurring an actual laser beam strike.

FIG. 9 shows a photograph image 900 of a laser receiver configured in accordance with FIGS. 8A-8D incurring an actual laser beam strike. The photograph image 900 therefore shows the form of the laser strike. As shown in image 900, the incoming laser beam has illuminated light receptive surface 920 to manifest intersection curve 910 as described hereinabove.

Figure 10:
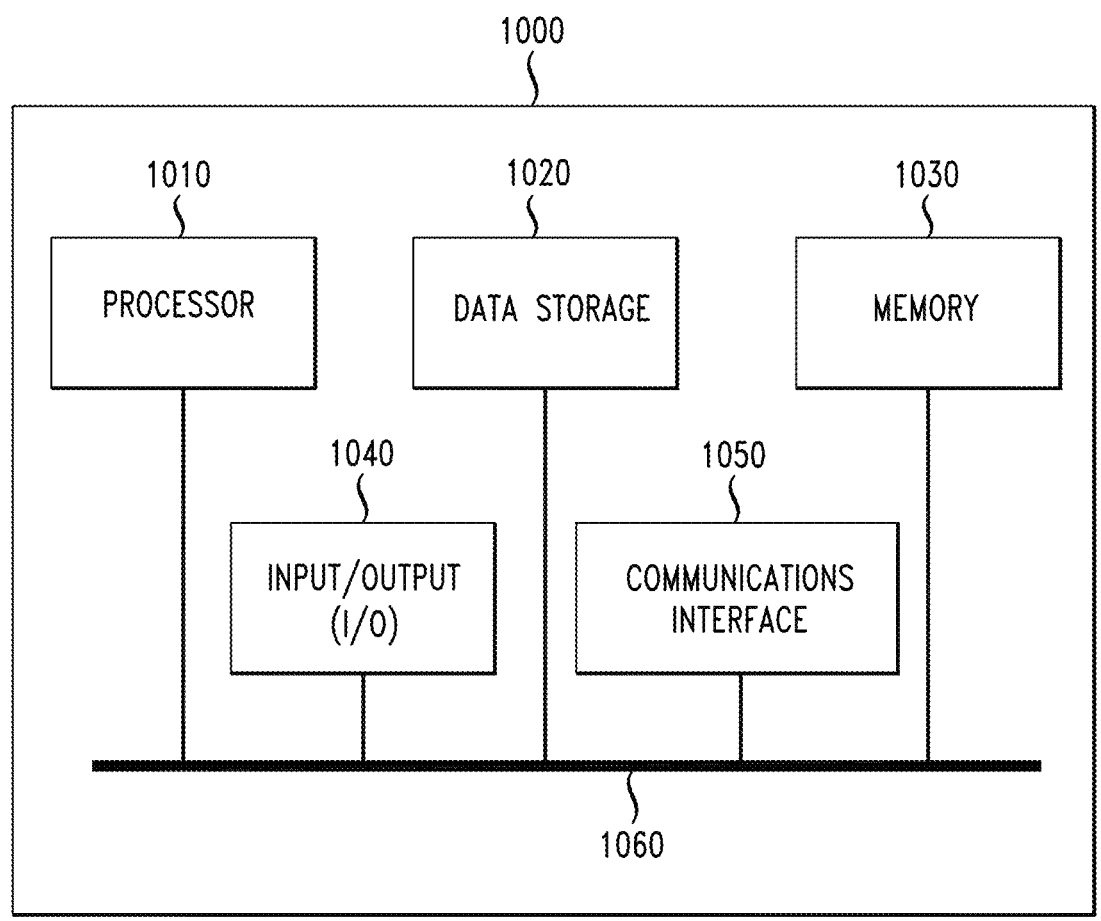
FIG. 10 is a high-level block diagram of an exemplary computer in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user device. FIG. 10 is a high-level block diagram of an exemplary computer 1000 that may be used for implementing a method for determining laser elevation and/or tilt in accordance with the various embodiments herein. Computer 1000 comprises a processor 1010 operatively coupled to a data storage device 1020 and a memory 1030. Processor 1010 controls the overall operation of computer 1000 by executing computer program instructions that define such operations. Communications bus 1060 facilitates the coupling and communication between the various components of computer 1000. The computer program instructions may be stored in data storage device 1020, or a non-transitory computer readable medium, and loaded into memory 1030 when execution of the computer program instructions is desired. Thus, the steps of the disclosed method (see, e.g., FIG. 6 and the associated discussion herein above) can be defined by the computer program instructions stored in memory 1030 and/or data storage device 1020 and controlled by processor 1010 executing the computer program instructions. For example, the computer program instructions can be implemented as computer executable code programmed by one skilled in the art to perform the illustrative operations defined by the disclosed method. Accordingly, by executing the computer program instructions, processor 1010 executes an algorithm defined by the disclosed method. Computer 1000 also includes one or more communication interfaces 1050 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Computer 1000 also includes one or more input/output devices 1040 that enable user interaction with computer 1000 (e.g., camera, display, keyboard, mouse, speakers, microphone, buttons, etc.).

Processor 1010 may include both general and special purpose microprocessors, and may be the sole processor or one of multiple processors of computer 1000. Processor 1010 may comprise one or more central processing units (CPUs), for example. Processor 1010, data storage device 1020, and/or memory 1030 may include, be supplemented by, or incorporated in, one or more application-specific integrated circuits (ASICs) and/or one or more field programmable gate arrays (FPGAs).

Data storage device 1020 and memory 1030 each comprise a tangible non-transitory computer readable storage medium. Data storage device 1020, and memory 1030, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1040 may include peripherals, such as a camera, printer, scanner, display screen, etc. For example, input/output devices 1040 may include a display device such as a cathode ray tube (CRT), plasma or liquid crystal display (LCD) monitor for displaying information to the user, a keyboard, and a pointing device such as a mouse or a trackball by which the user can provide input to computer 1000.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in a computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A laser receiver comprising:
  a light receptive surface having a fixed geometry;
  an image sensor internal to the light receptive surface for detecting an illumination of the light receptive surface; and
  a processor for determining an elevation using the illumination of the light receptive surface detected by the image sensor.

2. The laser receiver of claim 1 wherein the fixed geometry of the light receptive surface is one of a cone, rectangle, sphere, ellipsoid, and paraboloid.

3. The laser receiver of claim 2 wherein the illumination of the light receptive surface manifests as an arc with a fixed radius.

4. The laser receiver of claim 2 wherein the light receptive surface is defined by a plurality of pixels.

5. The laser receiver of claim 4 wherein vision recognition is applied in the determining the elevation using the illumination of the light receptive surface detected by the image sensor.

6. The laser receiver of claim 5 wherein the vision recognition determines a position of the illumination on the light receptive surface using at least one pixel of the plurality of pixels.

7. The laser receiver of claim 1 wherein a tilt angle is determined by the processor using the illumination of the light receptive surface.

8. The laser receiver of claim 7 wherein the illumination of the light receptive surface manifests as an ellipse.

9. The laser receiver of claim 1 wherein the image sensor is one of a charge-coupled device (CCD), digital camera and CMOS image sensor.

10. The laser receiver of claim 1 further comprising:
a mirror for use in the detecting of the illumination of the light receptive surface by the image sensor.

11. The laser receiver of claim 1 further comprising:
a photodiode;
a compound parabolic concentrator; and
wherein the photodiode and the compound parabolic concentrator facilitate a synchronization of the image sensor with the illumination of the light receptive surface.

12. The laser receiver of claim 11 further comprising:
a transparent housing configured for blocking one or more wavelengths of light.

13. A method for determining an elevation of a laser receiver, the method comprising:
receiving a light beam by a light receptive surface, the light receptive surface having a fixed geometry;
detecting an illumination of the light receptive surface using an image sensor that is configured internal to the light receptive surface; and
determining the elevation using the illumination of the light receptive surface.

14. The method of claim 13 wherein the fixed geometry is one of a cone, rectangle, sphere, ellipsoid, and paraboloid.

15. The method claim 14 wherein the illumination of the light receptive surface manifests as an arc with a fixed radius.

16. The method of claim 15 further comprising:
determining a tilt angle using the illumination of the light receptive surface.

17. The method of claim 13 wherein vision recognition is applied to determine a position of the illumination on the light receptive surface and the position of the illumination on the light receptive surface is used to determine the elevation of the laser receiver.

18. A system for determining an elevation and tilt angle of an object, comprising:
a light receptive surface with a fixed geometry; and
an image sensor configured internal to the light receptive surface to detect an illumination of the light receptive surface and determine the elevation and the tilt angle using the illumination of the light receptive surface.

19. The system of claim 18 wherein the fixed geometry is one of a cone, rectangle, sphere, ellipsoid, and paraboloid.

20. The system of claim 19 wherein the object is a laser receiver, and the elevation is of the laser receiver.

21. The system of claim 20 wherein vision recognition is applied to determine a position of the illumination on the light receptive surface and the position of the illumination on the light receptive surface is used to determine the elevation and the tilt angle of the laser receiver.

22. The system of claim 19 wherein the light receptive surface is configured within the object and the illumination of the light receptive surface is from a laser beam.

23. The system of claim 22 wherein the light receptive surface is configured to block one or more wavelengths of light.

24. The system of claim 18 wherein the image sensor includes one of a camera, a charge-coupled device (CCD) and CMOS image sensor.

25. A non-transitory computer-readable medium storing computer program instructions for determining an elevation of a laser receiver, the laser receiver having a light receptive surface with a fixed geometry, the computer program instructions, when executed on a processor, cause the processor to perform operations comprising:
detecting an illumination of the light receptive surface using an image sensor that is configured internal to the light receptive surface; and
determining the elevation of the laser receiver using the illumination of the light receptive surface.

26. The non-transitory computer-readable medium of claim 25 wherein the operations further comprise:
determining a tilt angle of the laser receiver using the illumination of the light receptive surface.

* * * * *